United States Patent [19]

Leung

[11] 3,961,922
[45] June 8, 1976

[54] VANE SEPARATOR

[75] Inventor: Kam Fong Leung, Little Elm, Tex.

[73] Assignee: Dallas Research Enterprises, Dallas, Tex.

[22] Filed: Jan. 2, 1975

[21] Appl. No.: 537,927

[52] U.S. Cl. .................................. 55/440; 55/444
[51] Int. Cl.² .......................................... B01D 45/08
[58] Field of Search ............. 55/184, 185, 201, 204, 55/440, 442, 443, 444, 445, 446, 465, DIG. 37, 436, 491

[56] References Cited
UNITED STATES PATENTS

| | | | |
|---|---|---|---|
| 1,588,402 | 6/1926 | Frohlich | 55/440 |
| 1,761,177 | 6/1930 | Bradshaw et al. | 55/444 |
| 1,897,332 | 2/1933 | Raymond | 55/204 |
| 1,917,606 | 7/1933 | Sillers | 55/184 |
| 2,125,271 | 8/1938 | Dahlman | 55/440 |
| 2,163,095 | 6/1939 | Kopp | 55/184 |
| 2,276,277 | 3/1942 | Waters | 55/185 |
| 3,289,398 | 12/1966 | McIlvaine | 55/440 |
| 3,338,035 | 8/1967 | Dinkelacker | 55/440 |
| 3,517,486 | 6/1970 | Golden | 55/440 |
| 3,805,496 | 4/1974 | Sokolowski | 55/440 |

FOREIGN PATENTS OR APPLICATIONS

| | | | |
|---|---|---|---|
| 1,294,935 | 5/1969 | Germany | 55/440 |
| 551,684 | 5/1932 | Germany | 55/442 |

*Primary Examiner*—Frank W. Lutter
*Assistant Examiner*—David L. Lacey
*Attorney, Agent, or Firm*—Howard E. Moore; Gerald G. Crutsinger

[57] ABSTRACT

Apparatus for separating gas from liquid droplets comprising a chamber arranged such that gas passes along a zigzag path between spaced vane plates and then through an outlet. Each of the vane plates has stepped shoulders to form a circuitous path along which the gas passes such that the gas will rub against and have maximum contact with the wall of the plates, depositing the droplets of liquid thereon. The droplets will fall to the bottom of the chamber where they may be removed at periodic intervals from the chamber. The gas passes from the chamber in a dry state, free of the droplets of liquid.

7 Claims, 6 Drawing Figures

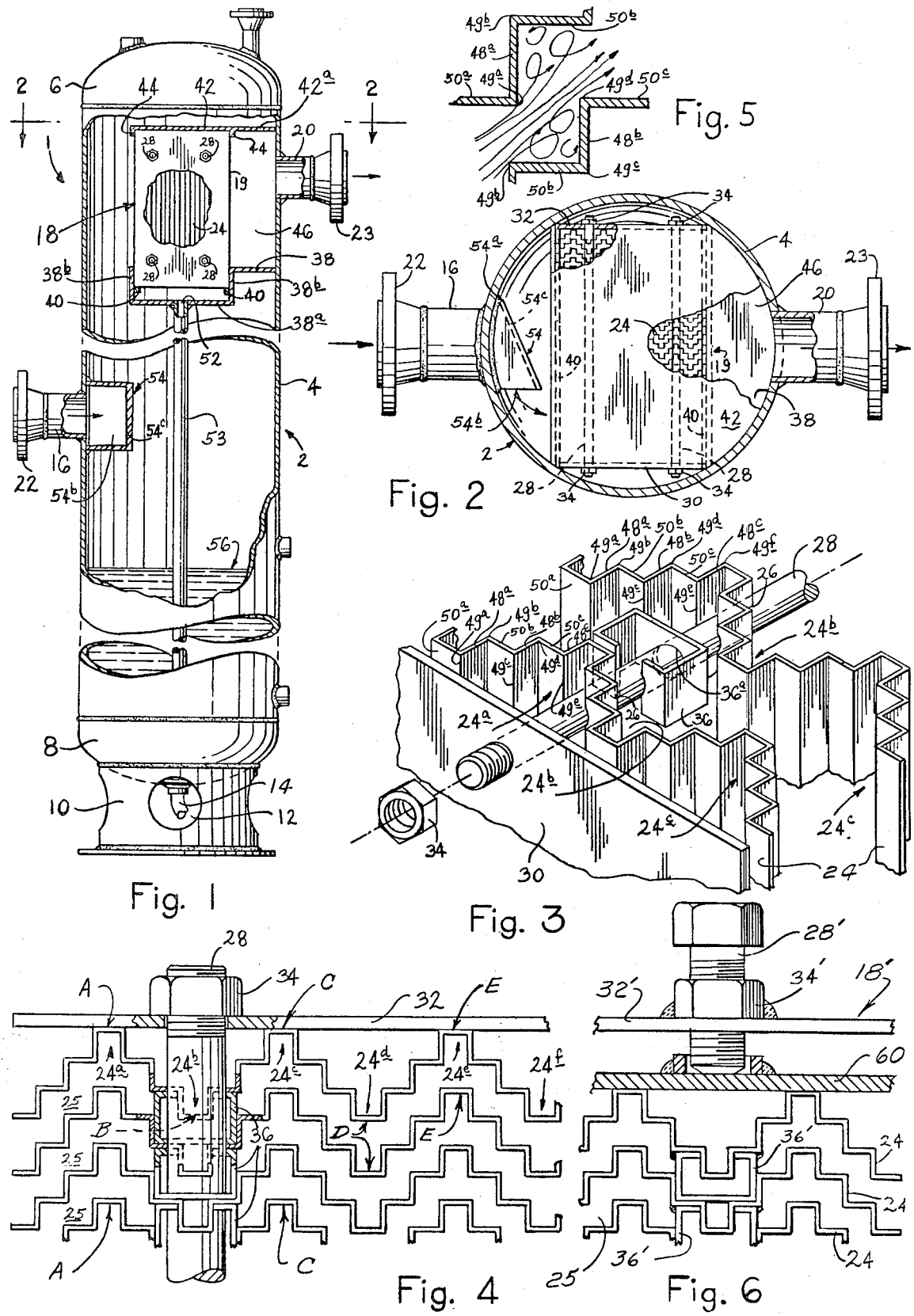

VANE SEPARATOR

BACKGROUND OF THE INVENTION

Various gases and hydrocarbon gases used in chemical plants, petro-chemical plants, power generation plants and gas production, transmission and distribution systems must be dried in order to prevent damage to equipment and/or contamination of of the process or processes.

Devices which remove the liquid from the gas are of two types: (1) a filter mesh screen, and (2) a vane separator. The principle behind vane separators is to cause the gas to wipe against the plates thereby causing the liquid to be condensed on the plates and drain therefrom.

This invention is addressed to an improvement in vane separators.

Vane separators heretofore have employed a plurality of plates having pockets secured to the curved surfaces thereof so that as the gas passes through the curved vanes, the liquid will contact the pockets and be removed therefrom. However, such plates must be formed from two separate plates on which the pockets are welded or otherwise secured. Such pockets are turned against the direction of flow of gases therethrough and create high resistance to gas flow, thereby reducing pressure on the outlet side of the separator.

SUMMARY OF THE INVENTION

I have devised a vane separator employing a plurality of vertical plates with stepped bends to contact the gas as it passes therethrough. The plates have stepped bends which provide an increased area for the gas to rub against as it passes through the vane bodies and thus provide an increased amount of liquid removal from the gas without unduly obstructing flow. None of the stepped bends have pockets thereon turned against the direction of flow of gas and thus do not appreciably decrease the pressure of the gas at the outlet end. Droplets of liquid, removed from the gas, form on the walls of the plates and drain into a receptacle which empties into a conduit. The conduit carries the liquid to the bottom of the vane separator chamber from which it may be removed at periodic intervals. The chamber has an inlet opening with a diagonal baffle disposed over the opening therein which causes large liquid globules within the gas to bounce at an angle from the baffle, thereby breaking the large globules up into smaller water droplets which may be filtered out as they pass between the vanes of the vane separator.

The primary object of the invention is to provide stepped body vanes in a vane separator which increases the surface against which the gas may rub, yet does not appreciably decrease the pressure of the gas as it passes therethrough.

Another object of the invention is to eliminate the need for welding pockets on plates or welding a multiplicity of plates together to form vanes, thus minimizing the production costs.

A further object of the invention is to increase the flow through the vane separator without reducing the amount of liquid removed from the gas.

A still further object of the invention is to provide a smooth flow of the gas through the dryer, thus minimizing the retarding effect of the vane separator on the flow of gas therethrough.

A general object of the invention is to provide a more efficient vane separator with minimum retardation of flow therethrough.

Other and further objects of the invention will become apparent upon referring to the detailed description hereinafter following and to the drawings annexed hereto.

DESCRIPTION OF THE DRAWINGS

Drawings of a preferred embodiment of the invention are annexed hereto so that the invention may be better and more fully understood, in which:

FIG. 1 is a frontal partially sectionalized elevational view of the separator;

FIG. 2 is a cross-sectional view taken along line 2—2 of FIG. 1;

FIG. 3 is an enlarged, exploded perspective view of the vane plate construction;

FIG. 4 is an enlarged plan view of the vane plate;

FIG. 5 is an enlarged plan view of a stepped bend;

FIG. 6 is an enlarged plan view of a modified form of vane plate mounting.

Like numeral references are employed to designate like parts throughout the various figures of the drawings.

DESCRIPTION OF A PREFERRED EMBODIMENT

Referring to FIG. 1 of the drawings, the numeral 1 generally designates a dryer which comprises a chamber 2 having a wall 4, an upper end 6, and a lower end 8 rigidly secured by welding to the chamber 2. The lower end 8 is secured to a base support 10 having holes 12 formed therein for access to the drain line 14 threadedly secured in the lower portion of end 8.

The gas to be dried is passed through inlet nozzle 16 and through the vane separator means 18 and out through outlet nozzle 20. The inlet nozzle 16 has a flange 22 formed therearound for fastening to a conduit (not shown) carrying the gas to the dryer 1. The inlet nozzle is formed below the vane separator means 18 to cause the gas to rise upwards to the vane separator means 18 so that gravity can coagulate some of the smaller droplets and cause them to drop to the bottom of the separator. The outlet nozzle 20 has a flange 23 thereon for connection to a gas line (not shown) and is located against the exhaust side 19 of the vane separator means 18 so that the dry gas may not circulate around the chamber 2 to pick up some of the liquid which has been removed from the gas.

The vane separator means 18 comprises a plurality of vertically arranged vane plates 24, having aligned apertures 26 formed therein to receive rods 28. The rods 28 extend through side plates 30 and 32 and have nuts 34 threadedly engaged to each end thereof in order to secure the vane plates 24 between side plates 30 and 32 to allow disassembly of the vanes 24. Each spacer clip 36 has an aperture 36a formed in one end thereof to receive the rods 28. Clips 36 are positioned between vertical plates 24 to space the plates 24 apart and to form a zigzag path 25 along which the gas passes.

The vane separator means 18 is supported by a lower support member 38 having a laterally extending wall rigidly secured to chamber wall 4 and vertically extending portions 38b with lugs 40 rigidly secured thereto in order to space end plates 30 and 32 from bottom 38a of support member 38. Bottom 38a forms a receptacle pan to collect the water from the plates 24. An upper support member 42 is rigidly secured to chamber wall 4 and has a laterally extending wall 42a with spaced lugs 44 secured thereto contacting end plates 30 and 32 to prevent lateral movement thereof.

A compartment 46 is formed by the lower support member 38, the upper support member 42, and the chamber wall 4. The compartment 46 communicates with the interior of the vane separator means 18 and the outlet nozzle 20 and is sealed from the remainder of the chamber 2 so as to prevent re-entry of liquids into the gas which has been dried.

Each vane plate 24 is preferably of unitary construction comprising sheet material shaped to form a series of vane plate segments extending between points of inflection A, B, C, D and E. The vane plate segments are arranged in a zigzag configuration and each vane plate segment is preferably shaped to form a series of right angularly disposed wall surfaces 50a, 48a, 50b, 48b, 50c, 48c. The wall surfaces intersecting corners 49a, 49c and 49e form surfaces of discontinuity projecting into path 25. The wall surfaces intersecting at corners 49b, 49d and 49f form pockets along each side of path 25 and adjacent the surfaces of discontinuity.

The vertically disposed vane plates 24 have pockets 24a, 24b, 24c, 24d, 24e, and 24f, and formed at the points of inflection A,B,C, D, and E, by a plurality of right angular stepped bends 49a, 49b, 49c, 49d, 49e, and 49f formed by the right angular intersection of transversely disposed walls 48a, 48b, and 48c and longitudinally disposed walls 50a, 50b, and 50c. The stepped design forms successive stepped pockets 24a–24f each having six separate surfaces against which the gas impinges as it passes therethrough thus increasing the surfaces to which the gas is exposed.

The pockets 24a–24F of each vane plate are aligned with the pockets 24a–24f of the adjacent plate 24. This allows the pockets 24a–24f of adjacent plates 24 to interengage in a zigzag pattern such that the pockets 24a–24f from the second plate 24 will slide into pockets 24a–24f of the first plate 24.

The stepped bends 49a–49f formed by transverse walls 48a–48c and longitudinal walls 50a–50c form a zigzag path 25 through which the gas must travel. As the gas enters paths 25 between vane plates 24, the stepped bends 48a–48f project into the flow of gas. As illustrated in FIG. 5, bend 49b of the lower vane plate 24 projects into the flow and the steady stream will be thrown clear of bend 49b. At the line between bends 49b and 49d there is a discontinuity of velocity but not of fluid. In the area behind bend 49b toward bend 49c a lower pressure area is formed.

Friction of the fluid and the abrupt change in velocity causes large frictional forces tangential to the direction of motion. The dead fluid in the area toward bend 49c of lower plate 24 is set into rotation by the stream. These form eddies in the interior bend 49c of lower plate 24. The eddies are formed in interior bends 49b of the upper plate 24 as illustrated in FIG. 5 in the same manner.

The small droplets in the gas are carried out of the main stream into the eddies. As the fluid is diverted it is caused to rotate against wall 48b of the lower plate 24. The droplets follow the fluid until the tangent of rotation is parallel to wall 48b causing the droplet to roll along wall 48b out of the fluid flow and be impinged against wall 50b.

The zigzag pattern formed by pockets 24a–24f cause a projection into the main flow path 25 at pocket 24a which cause discontinuity of velocity in the center of path 25 to cause eddy build up in the center of the path 25. This creates turbulence in the center of path 25 which causes the fluid in the center to be forced into the eddies against walls 48 and 50. The width between plates 24 should be such that the fluid will not pass in a straight line. Actual widths and number of pockets and stepped bends will depend on the gas being dried and flow pressures and rates.

As the droplets form on the plates 24 the force of gravity causes the liquid to run downwardly toward bottom 38a of support member 38. The liquid is then captured by bottom 38a of support member 38 and funneled toward aperture 52 which communicates with drain line 53. Drain line 53 extends downwardly toward the bottom of the chamber 2 where the condensed liquid is deposited. The liquid 56 is removed through drain line 14.

The unique design of the stepped bends formed by transverse walls 48 and longitudinal walls 50 maximizes the area against which the gas may be wiped and in addition eliminates multiple construction or the welding of pockets on the vanes in order to trap the gas and the liquids against the wall thereof.

An inlet baffle 54 is rigidly secured adjacent inlet nozzle 16 in a diagonal position having closed end 54a and an open end 54b. Large droplets of liquid may strike the rear wall 54c of the baffle 54 and are broken up, or fall downwardly, in order that the vane separator means 18 may more readily remove the liquid without causing clogging of the vane plates 24.

Operation of the hereinbefore described invention is as follows:

A gas containing droplets of liquid is passed through inlet nozzle 16 where the gas strikes inlet baffle 54 breaking up any large droplets of liquid. The gas is then caused to rise upwardly because of the lesser pressure at the outlet nozzle 20 than at the inlet nozzle 16 and passes laterally through the vane separator means 18. As the gas is forced through the zigzag paths 25 and pockets 24a–24f formed in vane plates 24, the gas is caused to impinge against the plate walls 48 and 50. As this occurs eddy currents are set up in the pockets 24a–24f in the interior bends between transverse walls 48 and longitudinal walls 50 thus drawing the gas from the center of the paths 25 toward the plates 24. The liquid carried by the gas is wiped from the gas rolling along the walls 48 and 50 in the plates 24 and the force of gravity draws the liquid downwardly toward the bottom 38a of support member 38. The liquid is then funneled through drain line 53 into the bottom of chamber 2 from which it may be periodically removed. The gas then passes from the vane separator means 18 into compartment 46 from which the dried gas passes into outlet nozzle 20 and through a conduit (not shown) connected thereto.

A modified form of vane plate mounting structure is illustrated in FIG. 6 of the drawing.

The vane plates 24 in the embodiment illustrated in FIG. 6 are identical to vane plates 24 hereinbefore described. Each spacer clip 36' is secured to one of the vane plates 24, as by welding, to facilitate assembly of plates 24 to form zigzag paths 25.

A jack plate 60 is disposed inside vane separator 18' and is positioned substantially parallel to side plate 32'. Set screws 28' extend through threaded nuts 34' welded to side plate 32' and ends of the set screws engage jack plate 60.

It should be readily apparent that vane plates 24 and jack plate 60 are supported by lugs 40. Upon adjustment of set screws 28', jack plate 60 urges spacer clips 36' into engagement with vane plates 24 to prevent lateral movement of the vane plates 24.

It should be appreciated that while in the illustrated embodiment of the invention the flow of gas is horizontal, flow may be vertical or angular without departing from the basic concept of the invention. If vane separator 18 were mounted in an in-line separator, wherein the inlet nozzle 16 and outlet nozzle 20 are axially aligned, the baffle 54 would be eliminated.

Vane plates 24, spaced apart to form zigzag paths 25, effectively remove entrained liquid from gas or vapor streams if flow is reversed and delivered from nozzle 20 to nozzle 16.

From the foregoing it should be readily apparent that the embodiment hereinbefore described accomplishes the objects of the invention hereinbefore discussed.

It should be appreciated that other and further embodiments of the invention may be devised without departing from the basic concept thereof.

Having described my invention, I claim:

1. Apparatus for separating droplets of liquid from gas flowing through a chamber having an inlet and an outlet comprising: first and second side plates in the chamber; first and second zigzag shaped vane plates; support means in the chamber supporting said first and second zigzag shaped vane plates between said first and second side plates and in spaced apart relation such that a zigzag shaped path is formed between said first and second vane plates, spacer means between said vanes plates, and means urging said vane plates into engagement with said spacer means, said zigzag shaped plates having one end communicating with the inlet of the chamber and another end communicating with the outlet of the chamber, said vane plates having points of inflection intermediate the opposite ends of each of said zigzag-shaped plates; each of said vane plates being shaped to form a series of zigzag shaped vane plate segments intermediate the points of inflection, each of said vane plate segments being shaped to form a series of substantially right angularly disposed surfaces arranged such that surfaces of discontinuity are formed and which define the zigzag shaped path between the points of inflection while forming pockets along each side of said zigzag shaped plates adjacent said surfaces of discontinuity; each of said vane plate segments comprising surfaces extending substantially parallel to said first and second side plates and surfaces disposed perpendicular thereto.

2. The combination called for in claim 1 wherein the support means comprises: a lower support member having vertically extending portions and a laterally extending lower wall secured to an interior wall of the chamber; spaced lugs secured to the vertically extending portions of the lower support member to space the vane plates from the lower wall of the lower support member; and an upper support member having a laterally extending wall secured between the vane plates and the chamber's interior wall.

3. The combination called for in claim 2 wherein the laterally extending walls of the support members form a discharge compartment between the outlet and the discharge side of the spaced vane plates to direct gas through the outlet after it passes between the vane plates.

4. The combination called for in claim 2 with the addition of a drain line extending from the lower wall of the lower support to a point spaced from the lower end of the chamber.

5. The combination called for in claim 1 wherein the means urging said vane plates into engagement with the spacer means comprises: spaced attachment rods extending through the side plates and through the vane plates; and means to secure the rods to the side plates.

6. The combination called for in claim 5 wherein the rods extend through passages in the spacer means and are secured on the outer faces of the side plates by threaded nuts whereby the rods may be removed for disassembly of the vane plates.

7. The combination called for in claim 1 wherein the support means comprises: spaced first and second side plates; a jack plate; screw means threadedly secured to said first side plate, said screw means engaging said jack plate to urge said vane plates toward said second side plate.

* * * * *